April 21, 1942.  H. J. SANDELL  2,280,266
CONDUCTING AND DISPENSING SYSTEM FOR BEER
Filed April 30, 1940
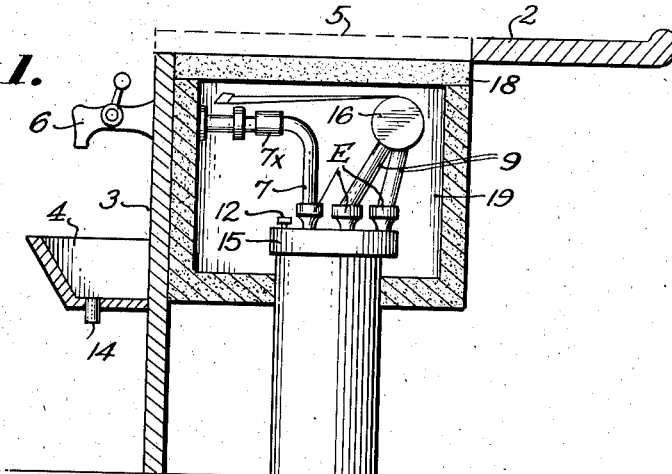
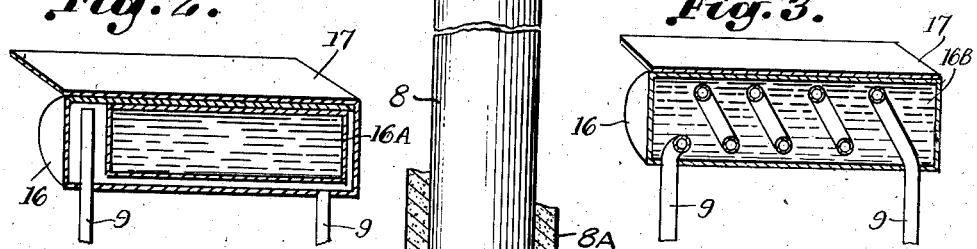
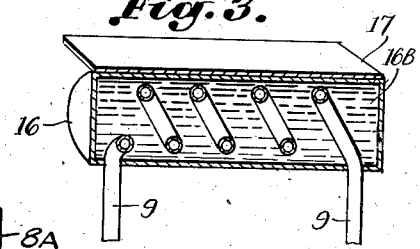
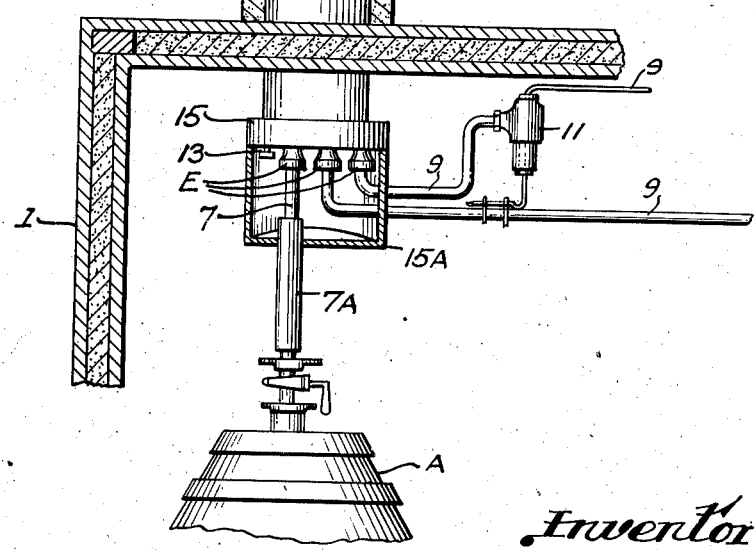
Inventor,
Harry J. Sandell Patented Apr. 21, 1942

2,280,266

UNITED STATES PATENT OFFICE 2,280,266

CONDUCTING AND DISPENSING SYSTEM FOR BEER

Harry J. Sandell, Long Beach, Calif.

Application April 30, 1940, Serial No. 332,591

1 Claim. (Cl. 62—141)

My invention provides a simple and highly efficient improvement in a sealed tight insulating, conducting and dispensing system for beer and other liquids that is adaptable for either metallic or non-metallic or transparent dispensing pipes.

The invention also provides an extremely simple and efficient means whereby the normally used beer dispensing coil and coil box or cooling and bleeding tanks with their complicated float mechanisms can be eliminated. The elimination of the above items makes a more compact and sanitary installation with a minimum cost of installation.

The primary object of the invention is to provide a combination of devices comprising a sealed tight insulating and conducting casing containing space or vacuum space extending from a source of supply to an insulated sealed tight inspection chamber closely adjacent a dispensing outlet for the purpose of constantly maintaining a low uniform temperature along a metallic or non-metallic dispensing pipe encased within the casing and inspection chamber.

Some of the other chief objects of the invention are to provide means of (a) entry into inspection chamber, (b) cooling and temperature holdover within inspection chamber, (c) directly cooling dispensing faucet, (d) protecting dispensing pipe extending ends beyond end closure caps, (e) shock absorbing members at points of sealed closure caps entry and exit of dispensing pipes and in dispensing pipe line, (f) a combination dispensing pipe and hose support attached to lower end of casing, and (g) the latter leaving a short space of dispensing pipe exposed between the lower sealed closure cap and ends of hose so that contents of dispensing pipes may be seen when non-metallic transparent pipes are used.

I have discovered that by the use of non-metallic dispensing pipe (preferably glass, etc.) the beer drawn will hold its head longer thereby increasing its looks, sale and palatability.

In the accompanying drawing, which illustrates the invention, like characters indicate like parts throughout.

Referring to the drawing, Fig. 1 is a vertical section with some parts shown in full and some parts broken away to illustrate my invention. Fig. 2 is a horizontal sectional view of a temperature holdover container. Fig. 3 is a similar view of another apparatus embodied in my invention.

Referring first to Fig. 1, numeral 1 indicates a portion of an ordinary beer storage refrigerator. Numeral 2 indicates a portion of a dispensing counter or bar, 3 a counter dispensing unit provided with drip pan 4, faucet 6 and bar drainer 5.

Numeral 8 indicates the closed insulating and conducting casing or conduit containing space which extends from the source of liquid supply to the insulated sealed tight inspection chamber, the space contained in casing 8 may be either vacant, dead air, evacuated, gas free, or vacuum. Numeral 7 is the metallic or non-metallic dispensing pipe which extends from the dispensing faucet 6 down through the space contained in casing 8 to a point directly above the inside top of pipe end protector and hose supporter 15A where a hose or flexible connecter 7A connects the end of dispensing pipe with the container A which is located in storage refrigerator 1. Casing 8 is fitted at its upper and lower ends with sealed closure caps 15 as to form a closed substantially gastight chamber adapted to hold either vacant, dead air, evacuated, gas free or vacuum space. These caps are equipped with means E which are conventional caps containing rubber gaskets to provide a combination cushion and airtight joint at points of entry and exit of dispensing pipe 7 and refrigerating pipe 9 the latter is the means I provide for maintaining a uniform low temperature within casing 8 and inspection chamber 19. The degree of temperature within the casing and chamber is regulated automatically by an adjustable temperature regulator 11 which is controlled by thermostatic bulb 10.

Casing 8 is covered with insulation 8A. Numeral 12 is a capped aperture to permanently insert a temperature thermometer if desired. Numeral 13 indicates a capped exhaust aperture through which the air or space contained in casing 8 may be evacuated by external means, or evacuation or pressure reduction is done by internal means, by reducing the oxygen contents of the dead air contained in casing 8 (when no other evacuation has been made) by the refrigerating pipe 9. While the amount of pressure reduction created by refrigerating pipe 9 is very small I have discovered that it makes a much more efficient installation than one composed of an insulated open casing or a casing containing pressure.

Numeral 16 is a means of temperature holdover which can be arranged internally by containing a separate brine filled cylinder 16A as shown by the horizontal sectional view in Fig. 2, or have oil or brine 16B in a single cylinder as shown by the horizontal sectional view in Fig. 3, using oil or brine to hold over the low temperature between cycles of refrigeration. Numeral 17 is a flat fin attached to cylinder 16; its opposite or overhanging side and edge can be if desired bent around and attached to the shank of dispensing faucet 6 for the purpose of directly cooling dispensing faucet 6. Numeral 18 is the means of entry to inspection chamber 19 which is an insulated sealed tight chamber located closely adjacent the dispensing outlet.

It will be noted that the dispensing faucet in the average dispensing unit constitutes a considerable heat leakage by conduction as it extends out into space beyond the dispensing unit. It is usually cooled by the beverage that is drawn through it, but it warms up during periods of non or intermittent draught and while warm, it (the faucet) agitates by heat the first glass or two of beer until it is again cooled off by beer drawn.

My invention is provided with a low temperature holdover member 16 which acts as a low temperature accumulator during on cycles of refrigeration and as a heat absorber during off cycles of refrigeration. It supplies constant refrigeration for inspection chamber 19, and through flexible fin 17 to dispensing faucet 6, thereby eliminating wild or agitated beer caused by an intermittently used faucet.

The chief object of the inspection chamber 19 is to house and maintain the temperature holdover cylinder and at the same time provide means of inspection of the various connections therein. Also to show visible portions of dispensing pipes between upper sealed closure cap and dispensing faucet so contents of the dispensing pipes may be seen when non-metallic transparent dispensing pipes are used.

It will be obvious that non-metallic dispensing pipes are more or less fragile and easily broken if not properly protected. The extended member 15A is the means I provide for protecting the lower ends of dispensing pipes 7 and supporting the flexible hose 7A which during its use is continually shifted at the lower end in different positions so it will connect with tapping devices used in container A.

I have also discovered that there is considerable of a shock to the draft line (dispensing pipe, hose and faucet) when the faucet is opened and closed during draft of beer, so I provide a resilient connection in the draft line to eliminate any bad effects that may be caused by vibration to a non-metallic dispensing pipe.

*Explanation.*—In beer cooling and dispensing, the beer storage refrigerator is usually placed in the basement or other convenient places that require considerable piping and a coil to carry the beer and cool it from the storage refrigerator to the counter dispensing coil box. When this system is used, the beer leaves the cold refrigerator and runs exposed, then enters the beer coil, but due to the different and uneven temperatures along the line of draught the beer cannot be drawn or controlled at the faucet without considerable waste of beer, also the cost of refrigeration is considerably more due to the necessity of cooling the beer again in the counter dispensing box and the greater area of exposed surface involved.

It is of course understood that beer is a very sensitive product to an uneven temperature, or variation in temperatures, either of a hot or cold nature. It will be thermally agitated by warm temperature and flat if chilled. It is also subject to change its taste or flavor due to change of temperature. Also light is very injurious to it. And when it is being dispensed will be subject to a variable or intermittent draught.

In the operation of my improved system the beer is conditioned to the desired low temperature by mechanical refrigeration (not shown) in the storage refrigerator 1 and then conducted direct to the dispensing faucet 6 by the dispensing pipe 7 extending through the space enclosed in the insulating and conducting casing 8, and sealed inspection chamber 19. If beer is being drawn at frequent intervals it refrigerates the casing itself, if at a period that beer is not being drawn, say from closing time at night until opening time in the morning the automatic temperature regulator (which is set to provide the same degree of temperature within the casing 8 and inspection chamber 19 as that in refrigerator 1) will let enough refrigerant through it and the refrigerating pipe 9 to constantly maintain a uniform low temperature with the casing 8 and inspection chamber 19. If beer is kept at the correct uniform temperature from the barrel to the dispensing faucet as it is with this system it can be drawn very fast, without waste and with its natural flavor, as there is no chance of a variation of temperature (uneven temperature) anywhere in the line of its draught.

From the foregoing it will be obvious by reason of the space, vacuum space and sealed space the dispensing and refrigerating pipes are extended through in my improved system that the cost of refrigeration is very low and the other notable advantages previously designated as some of the chief objects of the invention are realized.

It will be understood that the device or system described herein as the preferred form is capable of modifications within the scope of the invention disclosed and claimed. For example the so-called casing or conduit might be horizontally extended to connect with a refrigerator on the same floor or level, it therefore follows that the term casing is used in a broad and liberal sense also a plurality of dispensing pipes may be used if desired. It will be understood that refrigerating pipe 9 is connected in communication with a source of refrigerant supply. Also refrigerating pipe 9 could be arranged to encircle the faucet shank in the inspection chamber thereby eliminating the extending fin if preferred. Also member 15A acts as a protector supporter and prevents twist or side movements of pipes or tubing. The broad term pipe includes tubing of all kinds.

What I claim is:

In a system of the class described, the combination comprising an elongated casing or conduit extending from a source of liquid supply to a closed substantially airtight compartment or chamber closely adjacent a dispensing outlet, said casing having end closure members, a dispensing pipe and refrigerating pipes extended through said casing, members and chamber, said members being provided with means of tight connections at points of entry and exit of said pipes, means to regulate the temperature therein, means of temperature holdover comprising a liquid filled cylinder or container in contact with said refrigerating pipes in said chamber, a fin extending from said cylinder or container providing means of direct refrigeration to said dispensing outlet, means of entry to said chamber.

HARRY J. SANDELL.